A. M. OSBORN.

Loop for Harness.

No. 4,871. Reissued April 16, 1872.

Witnesses:
James L Kay
E. C. Fitler

Inventor:
Addison M. Osborn,
by Bakewell, Christy & Kerr,
his Attys.

AM. PHOTO-LITHOGRAPHIC CO. N.Y. (OSBORNE'S PROCESS.)

UNITED STATES PATENT OFFICE.

ADDISON M. OSBORN, OF GIRARD, PENNSYLVANIA.

IMPROVEMENT IN LOOPS FOR HARNESS.

Specification forming part of Letters Patent No. 118,046, dated August 15, 1871; reissue No. 4,871, dated April 16, 1872.

SPECIFICATION.

*To all whom it may concern:*

Be it known that I, ADDISON M. OSBORN, of Girard, in the county of Erie and State of Pennsylvania, have invented a new and useful Improvement in Metallic Loops; and I do hereby declare the following to be a full, clear, and exact description thereof, reference being had to the accompanying drawing making a part of this specification, in which—

Figure 1:
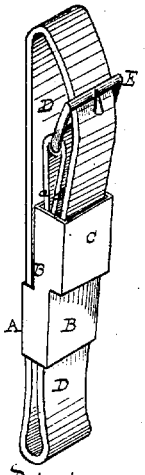
Figure 2:
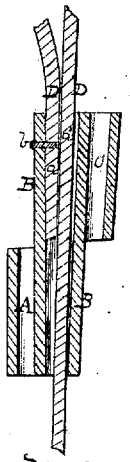

Figure 1 is a perspective view of my improved loop, as attached to a hame-strap; and Fig. 2 is a sectional view of the same somewhat enlarged.

Similar letters of reference indicate corresponding parts.

My invention has for its object to furnish an improved metallic loop which shall be so constructed as to hold the strap securely in place without any sewing, and which shall at the same time be simple in construction, convenient in use, and inexpensive in manufacture; and it consists in the features of construction hereinafter claimed.

To enable others skilled in the art to make and use my improvement, I will proceed to describe its construction and mode of operation.

The loop is made preferably of sheet metal. The central or main part B has an opening through of the form of the frustum of a wedge, the larger end being, when attached to the strap, toward the buckle E. The depth of the opening at the larger end is such as to receive two thicknesses or folds of the strap D, as shown in Fig. 2. Upon the inside lower wall of the larger end of the loop B is formed a projection, or to it is attached, a pin, *b*, which projects clear of the wall a sufficient distance to pass through the free end part *a* of the strap D. In applying the loop, the end *a* of the strap D is inserted into the larger end of the loop B, and a hole formed in it is passed over the pin or projection *b*. The other end of the strap (the buckle E being in place) is passed back through the loop B from its larger to its smaller end. The part *a'* of the strap D then comes between the end of the pin *b* and the inner face of the strap-end *a* on the one side, and the opposite inner wall of the loop on the other, and effectually prevents the end *a* from slipping off or being pulled off the pin *b*. The strap is thus confined in place without any sewing. Upon the upper side of the central loop B, at its smaller end, is formed a keeper-loop, A, of the ordinary construction, and upon its outer side, at its larger end, is formed a like keeper-loop, C. The strap D, after having been passed through the loop B, as above set forth, is carried back through the ring or eye of one hame, thence through the lower loop A, and through the ring or eye of the other hame. It is then buckled into the buckle E and its end is passed through the outer loop C, as shown in Fig. 1.

Having thus described my invention, what I claim as new, and desire to secure by Letters Patent, is—

1. In combination with the wedge-shaped loop B, provided with a fastening-pin, *b*, a keeper-loop on either face thereof, through which to pass the strap on its return fold, substantially as described.

2. The triple metallic loop A, B, C, constructed substantially as herein shown and described, and for the purpose set forth.

In witness whereof I, the said ADDISON M. OSBORN, have hereunto set my hand.

ADDISON M. OSBORN.

Witnesses:

E. H. SCOTT,

ERASTUS HATHAWAY.